Patented Jan. 21, 1941

2,229,537

UNITED STATES PATENT OFFICE 2,229,537

AGE RESISTER

William D. Wolfe, Cuyahoga Falls, Ohio, assignor to Wingfoot Corporation, Wilmington, Del., a corporation of Delaware No Drawing. Application November 5, 1936, Serial No. 109,310

1 Claim. (Cl. 260—802)

This invention relates to a method for improving the age-resisting characteristics of deteriorable organic products and to products so preserved. More particularly, it relates to a method of preserving rubber and to rubber so treated.

It has previously been proposed to use hydrogenated diaryl amines as age-resisters or antioxidants in rubber, such compounds being readily dispersible in the rubber and having little or no tendency to bloom. It has now been found that certain derivatives of hydrogenated aryl-naphthyl amines are also useful age-resisters for rubber and other deteriorable organic materials. The new derivatives are prepared by reacting the hydrogenated aryl naphthyl amine with a ketone under suitable conditions to form a complex or composite reaction product which is utilized as such without separation into the individual constituents of the mass.

The invention may be illustrated by the reaction product of phenyl AR-tetrahydro beta naphthylamine and acetone, the two substances being reacted in an autoclave in the presence of hydriodic acid or other catalyst. Other hydrogenated diaryl amines can be similarly reacted with other ketones, the products in all cases being complex mixtures which are used directly as age-resisters without purification.

Among the hydrogenated aryl naphthyl amines which can be employed in the reaction may be mentioned phenyl AR-tetrahydro alpha naphthylamine, phenyl AR-tetrahydro beta naphthylamine, phenyl AC-tetrahydro alpha naphthylamine, phenyl AC-tetrahydro beta naphthylamine, tolyl AR-tetrahydro alpha naphthylamine, tolyl AR-tetrahydro beta naphthylamine, tolyl AC-tetrahydro alpha naphthylamine, tolyl AC-tetrahydro beta naphthylamine, alpha naphthyl AR-tetrahydro alpha naphthylamine, alpha naphthyl AR-tetrahydro beta naphthylamine, beta naphthyl AR-tetrahydro alpha naphthylamine, beta naphthyl AR-tetrahydro beta naphthylamine, and the corresponding alicyclic (AC) isomers of these aromatic (AR) hydrogenated dinaphthyl compounds. Likewise, secondary dinaphthyl amines in which both of the naphthyl groups are tetra hydrogenated in either the AR or AC position may be employed. Generally, however, the aromatic (AR) compounds are preferred for antioxidant purposes over the alicyclic (AC) compounds in most instances including all types of compounds illustrated above.

Among the ketones which may be reacted with any of the foregoing hydrogenated aryl naphthylamines may be mentioned actone, methyl ethyl ketone, diethyl ketone, methyl isobutyl ketone, mesityl oxide, diacetone alcohol, acetophenone, benzophenone, di isopropyl ketone, dibutyl ketone, etc.

The reaction product thus obtained from the interaction of the hydrogenated secondary aryl naphthylamine and the ketone may either be used as such or it may be subjected to an acid treatment before being employed as an age-resister. In either case, the complex product has age-resisting properties but it is found that the acid-treated material is better as an antioxidant, whereas the untreated reaction product is better as a flex resister in rubber. The acid treatment may be effected by washing with aqueous hydrochloric acid, or any other suitable acid, such as another mineral acid, may be used. The acid treatment usually changes the viscous liquid product of reaction to a thick tar.

As illustrative of procedures which may be followed in preparing the age-resisters, the following examples are given, although the procedures may be varied in certain particulars while still yielding an effective age-resister.

Example 1

To 100 grams of phenyl AR-tetrahydro beta naphthylamine (B. P. 170–180°/2 mm.) are added 300 grams of acetone and 2 cc. of 50% hydriodic acid. The mixture is heated in an autoclave for a period of about 14 hours at a temperature of 195-210° C. At the end of this time the limpid dark brown liquid is distilled, first at atmospheric pressure and finally under a reduced pressure of 13 mm. of mercury until the temperature of the vapors given off reaches 115° C., at which point distillation has nearly ceased and white fumes rise from the liquid. The residue, weighing 105 grams, is used as an age-resister.

Example 2

A 60 gram portion of the residue obtained in the preceding example is treated with 15 to 20 cc. of concentrated hydrochloric acid containing 5 cc. of water. The mass changes, during this treatment, from a viscous liquid to a thick tar, which is washed thoroughly with water and dilute sodium hydroxide. The dried residue amounts to 53 grams and is used as an age-resister.

Example 3

To 100 grams of phenyl AR-tetrahydro beta naphthylamine are added 400 grams of acetone and 2 cc. of hydriodic acid. This mixture is heated in an autoclave at a temperature of 220°-240° C. for a period of 15 hours. The viscous liquid residual product, obtained by the purification steps described in Example 1, amounts to 137.5 grams and is reserved for tests in rubber. The corresponding acid-treated material is obtained by a procedure analogous to that set forth in Example 2 and was also reserved for test in rubber.

While certain conditions have been set forth in these examples, the same are not intended as critical but, on the contrary, modifications of the conditions may be made, as found desirable. Thus, a temperature between 175-250° C. will ordinarily be employed and the hydrogenated phenyl naphthylamine and ketone are preferably brought together with the ketone in large excess, as much as 10 to 15 mols of acetone being present to each mol of the hydrogenated phenyl naphthylamine. However, a smaller excess of ketone may be employed, from 5 to 15 mols of ketone to one of the amine having been found to give useful age-resisters. In the acid treatment, the amount of acid employed is not critical but sufficient is used so as to permeate the reaction product with a strongly acid medium.

The age-resistors obtained in the foregoing examples were then incorporated in a rubber stock of the following formula:

| | Parts by weight |
|---|---|
| Rubber | 100 |
| Zinc oxide | 5 |
| Sulfur | 3 |
| Hexamethylene tetramine | 1 |
| Stearic acid | 1.5 |
| Antioxidant | 1 |

Test pieces having the above composition but varying as to the antioxidant or age-resister in each piece, were placed in an oxygen bomb for six days at a temperature of 50° C. under a pressure of 150 pounds per square inch. This low temperature ageing test gave the following results.

| Cure time in mins., °F. | Tensile before ageing | Tensile after ageing | Wt. inc. |
|---|---|---|---|
| Phenyl AR-tetrahydro beta naphthylamine+acetone (Example 1) | | | |
| 35/285 | 116 | 58 | 0.28 |
| 50 | 134 | 91 | 0.41 |
| 70 | 163 | 101 | 0.56 |
| Phenyl AR-tetrahydro beta naphthylamine+acetone—Acid treated (Example 2) | | | |
| 35/285 | 110 | 115 | 0.06 |
| 50 | 142 | 135 | 0.12 |
| 70 | 146 | 140 | 0.17 |
| Phenyl AR-tetrahydro beta naphthylamine+acetone (Example 3) | | | |
| 35/285 | 104 | 43 | 0.24 |
| 50 | 120 | 84 | 0.32 |
| 70 | 138 | 101 | 0.49 |
| Phenyl AR-tetrahydro beta naphthylamine+acetone—acid treated (Example 3) | | | |
| 35/285 | 108 | 112 | 0.08 |
| 50 | 142 | 122 | 0.09 |
| 70 | 157 | 136 | 0.15 |

The age-resisters were also subjected to a flexing test in a rubber stock of somewhat different composition from that given above, the flex test being carried out on a machine which flexes the samples at a definite rate until failure occurs. The samples are tested against others which contain phenyl beta naphthylamine as the age-resister and the time elapsed to failure of the samples containing the age-resisters to be tested is compared with the time to failure of the samples containing phenyl beta naphthylamine (PBN) as a control. The figures given below express the results obtained with each age-resister as a percentage of the result obtained with the control. The tests were run on samples cured for 70 minutes and for 140 minutes at a temperature of 260° F.

| | Ratings on a flexing machine, in terms of PBN Control percent PBN Control | |
|---|---|---|
| | 70/260° F. | 140/260° F. |
| Phenyl AR-tetrahydro beta naphthylamine+acetone—Example 1 | 108 | 100 |
| Phenyl AR-tetrahydro beta naphthylamine+acetone, acid-treated (Ex. 2) | 91 | 94 |
| Phenyl AR-tetrahydro beta naphthylamine+acetone—Example 3 | 95 | 107 |
| Phenyl AR-tetrahydro beta naphthylamine+acetone, acid-treated (Ex. 3) | 92 | 90 |

It will be noted that the new age-resisters compare very favorably with the standard, phenyl beta naphthylamine, used as a control.

While the foregoing tests were carried out on rubber, the composite age-resisters are also useful with other rubber-like materials such as balata, gutta percha, synthetic rubber, reclaimed rubber, latex, etc., the term "rubber" as used in the appended claim being intended to include such rubber-like materials as well as rubber itself. The age-resister may be applied to the rubber or incorporated therein in any suitable manner and it may be used alone or in conjunction with vulcanizing agents, accelerators, pigments, fillers and other adjuvants customarily added to rubber. Also, the age-resisters may be used to treat other deteriorable organic materials, such as gasoline, transformer oils, vegetable oils, and the like.

While there have been described above certain preferred embodiments of the invention, it will be understood that the same are by way of illustration only and that the invention is not limited thereto. Accordingly, it is intended to cover in the appended claim all patentable features of the invention herein described.

What I claim is:

A method of improving the age-resisting characteristics of rubber which comprises incorporating therein a reaction product of an aryl tetrahydro naphthylamine and a ketone reacted at a temperature between about 195° and 240° C. for a period of 7 to 15 hours.

WILLIAM D. WOLFE.